Sept. 13, 1949.　　　　　F. C. BLACK　　　　　2,481,716
LENS TESTING DEVICE

Filed March 27, 1947　　　　　　　　　　　3 Sheets-Sheet 1

INVENTOR.
FREEMAN C. BLACK
BY
ATTORNEY

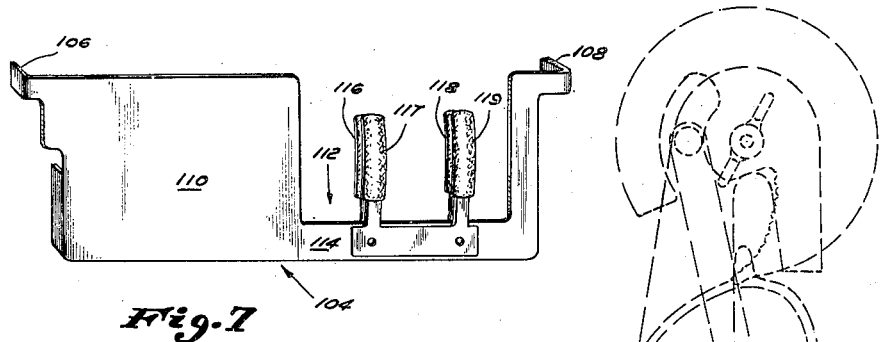
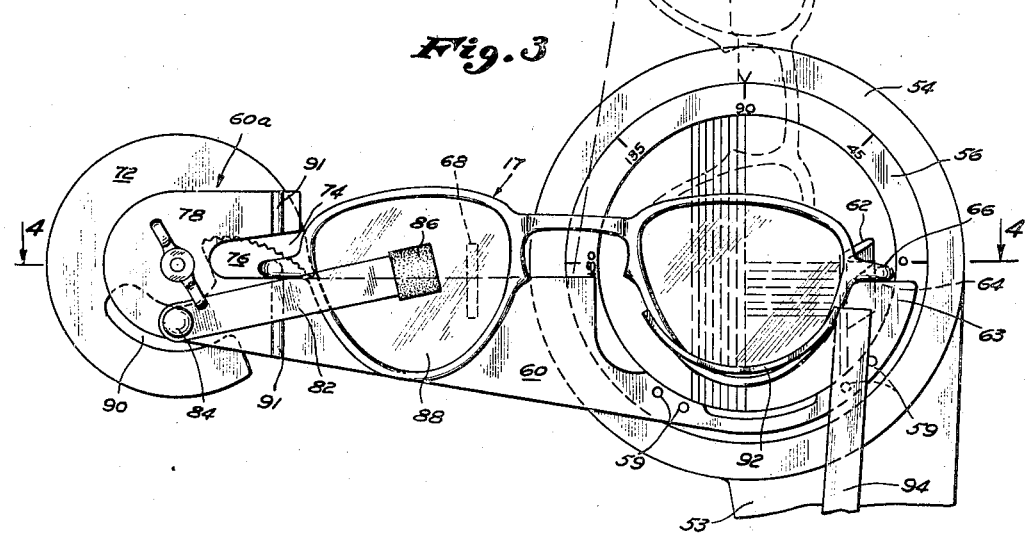
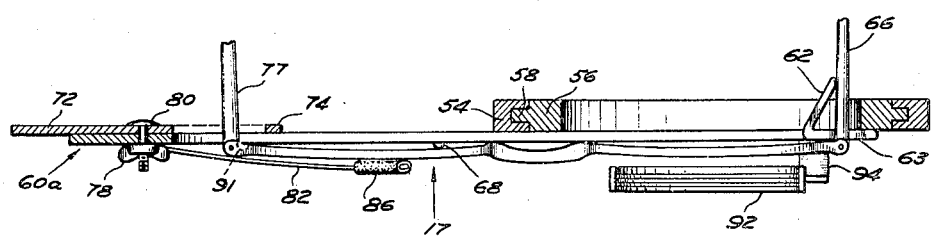

Sept. 13, 1949.　　　　　F. C. BLACK　　　　　2,481,716
LENS TESTING DEVICE

Filed March 27, 1947　　　　　　　　　　　　3 Sheets-Sheet 3

INVENTOR.
FREEMAN C. BLACK
BY
ATTORNEY

Patented Sept. 13, 1949

2,481,716

UNITED STATES PATENT OFFICE 2,481,716

LENS TESTING DEVICE

Freeman C. Black, Los Angeles, Calif.

Application March 27, 1947, Serial No. 737,607

5 Claims. (Cl. 88—56)

This invention relates to a device for determining the characteristics or prescription of a lens of the type commonly used in a pair of spectacles.

Spectacle lenses may be either spherical, cylindrical, or compound. Compound lenses are characterized by the ability to bend light toward two focal lines, which enables them to correct astigmatism by focusing the light unequally in different meridians. Both cylindrical and compound lenses have two principal meridians or axes ninety degrees apart. Accordingly, such lenses are usually examined by first locating these axes and then by determining the focal power of the lens along each of the pair of axes.

An axis of the lens may be located by viewing a straight line partly through the lens and partly outside the lens. Only when the viewed line is parallel to an axis of the lens will the two portions (that portion seen through the lens and that portion seen outside of the lens, respectively) appear continuous when viewed through the optical center of the lens. When the lens axis is disposed obliquely to the line, the two portions of the line will appear to be aligned in different directions, that is, the portion of the line seen through the lens will appear at an angle to the line itself. Accordingly, this axis is located by rotating the unknown lens in front of a straight line parallel thereto until the two portions appear continuous. Currently this process is carried out by hand and the axis then spotted with crayon or ink. The second principal axis is then known to be ninety degrees on either side of this first axis.

If the lens being tested is spherical, it will have no axes, and the line viewed will appear continuous in all meridians. If the lens being tested contains a prismatic element, there will be an apparent displacement of the line in the direction of the apex of the prism resultant in any particular meridian. The line viewed, then, must be aligned with an adjacent or nearly adjacent parallel line.

After the two principal axes are located, the focal power along each axis is then determined. This may be done by identifying a lens which will neutralize the unknown lens along this axis— that is, the power of the trial lens will be equal and opposite in sign to the power of the unknown lens which it neutralizes. This effect is based on the following principle: If an object be viewed through a plus lens, and if the observer's eye be inside the focal length of the lens, and the lens be moved along a particular meridan between the eye and the object, the apparent motion of the object as seen through the lens will be opposite to the actual motion of the lens, whereas if the lens being examined is a minus lens, the apparent motion will be with that of the lens. If a minus lens then be moved in unison with a plus lens of equal power, such apparent movement of the object will be neutralized and the object will not appear to move.

Accordingly the power of the unknown lens along each principal axis may be determined by oscillating the lens, together with successive trial lenses, along each principal meridian while viewing a target therethrough, until a trial lens is located which causes the target to stand still. The power of the unknown lens in this meridian will then be complementary or opposite in sign to that of the particular trial lens. If the lens being tested is cylindrical, it will contain all its power in one meridian and no power in the meridian at ninety degrees to it. If the lens being tested is spherical, its power will be uniform in all meridians.

Although an exceedingly small percentage of lenses actually contain prismatic elements, it is important when analyzing any lens to determine whether or not prism is present in its characteristics. This invention purports only to determine the presence of prismatic power, as manifested according to a previous paragraph, and incidentally will measure this power as resultant in each of the two principal meridians. The determination of the direction and power of such prism as is incorporated in the lens can then be accomplished by hand with trial case prisms.

It is an important object of the present invention to provide a lens-neutralizing device which may be used to accomplish the foregoing manipulations and determinations in a highly efficient and practical manner, which in itself is free from the technical complications of any lens system.

Another purpose is the provision of a lens neutralizer wherein either lens of a pair of spectacles may be rotated a measured amount while viewing a target therethrough and wherein the spectacle lens may be selectively oscillated while in any position of rotation.

Still another object is to provide such a lens neutralizer wherein either a pair of spectacles or a single unmounted lens may be mounted for testing.

A further purpose is the provision of such a device wherein a calibrated target, a lens rotating and oscillating structure, and a viewing position are arranged in measured and immediately operable relationship.

Other objects and advantages of the invention will be apparent from the following description and claims, the novelty consisting in the features of construction, combination of parts, the unique relations of the members and the relative proportioning, disposition, and operation thereof, all as more completely outlined herein and particularly pointed out in the appended claims.

Referring to the drawings, which form part of the present specification:

Figure 3 is an elevational view showing the spectacle-holding structure with a pair of glasses mounted therein in two positions 90° apart.

Figure 4 is a longitudinal sectional view of the spectacle-holding structure taken along the line 4—4 of Figure 3.

Figure 7 is a perspective view of a holder adapted to mount a single lens, in place of a pair of spectacles, on my lens neutralizer.

Figure 1:
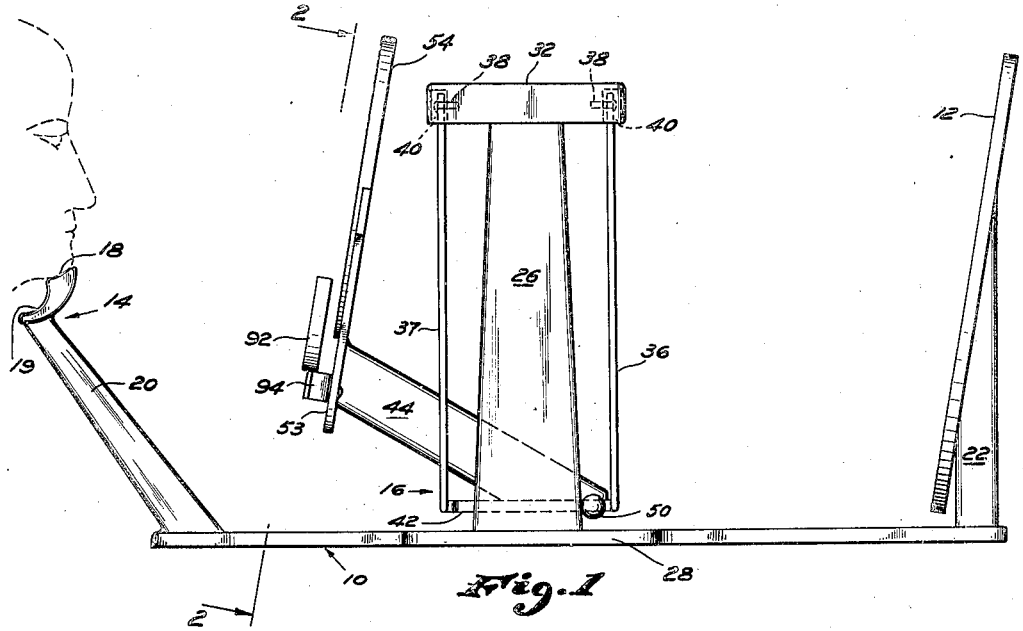
Figure 1 is a side elevational view of my lens neutralizer.

As here illustrated, my device is constructed with a flat, substantially cruciform base 10 having mounted respectively at its opposite ends, an upright viewing target 12, and an upstanding chin rest 14 in line therewith. Intermediate the two ends of the base there is provided a transversely reciprocal or swinging carriage 16 which is adapted to hold a pair of spectacles 17, the lenses of which are to be tested.

It is necessary to have the target 12 and the spectacles 17 disposed parallel to each other and also in axial alignment as viewed by the operator from the chin rest 14. This is accomplished in the apparatus of the present invention by mounting the spectacles and target in parallel planes, each of which extends at a small angle from the vertical.

As seen particularly in Figure 1, a pair of horizontal stepped grooves 18 and 19 disposed at the upper end of an outwardly projecting stem 20 of the chin rest are adapted to support the chin of a person seated before a desk or the like upon which the base 10 of the lens neutralizer is placed, the two grooves corresponding to different positions of the glasses as will be explained later. For viewing from such position, the target 12 which bears two series respectively of vertical and horizontal parallel lines spaced at that distance which represents ½ prism diopter of displacement, is fastened against an upright member 22. The forward supporting face of the upright member 22 is inclined rearwardly from the base to furnish the necessary slant for the inclined target which is secured rigidly thereto. The spectacles are likewise mounted in a manner described more fully hereinbelow, and with the lens thereof under test disposed in a plane parallel with the target. Moreover, the parts are so proportioned and arranged that the target 12, the lens under test, and an eye of the observer, whose chin is supported in the chin rest 14, are in axial alignment.

A pair of vertical posts 24 and 26 are fixed on opposite sides of the cross panel 28 of the cruciform base 10, each side post supporting on its upper end a longitudinal block 30 and 32, respectively. Each block 30 and 32 has suspended from each end thereof an upright rod 34, 35, 36, and 37, disposed adjacent the vertical edge of its respective side post 24 or 26, each of the several rods being pivotally held by a horizontal pin 38 which is inserted in the side wall of a downwardly opening aperture 40 of the block within which the end of the rod is received. The four swinging rods 34, 35, 36, and 37 are in turn secured at their lower ends to the corresponding corners of a horizontal carriage or platform 42 upon which is mounted an upwardly and forwardly projecting arm 44 which supports the spectacle-mounting assembly, the two ends of the swinging platform 16 being centrally cut away at 46 and 48 to allow it to swing free of the adjacent side posts 24 and 26. In practice, the swinging posts are of such length that the vertical component of the short arc of a few centimeters through which the platform 42 moves is less than a millimeter and hence negligible.

Figure 2:
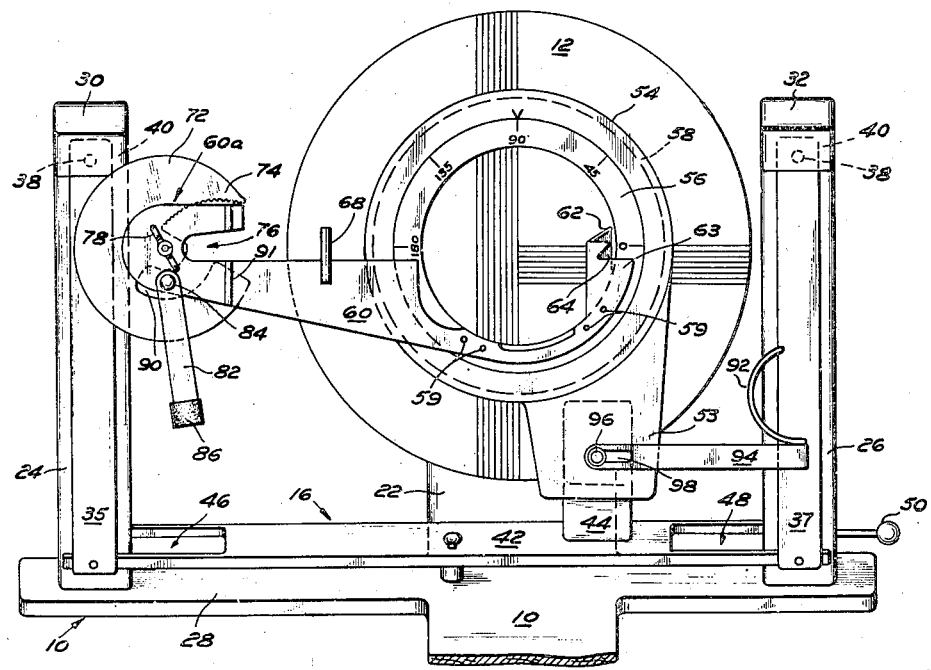
Figure 2 is a perspective view thereof as seen along the line 2—2 of Figure 1 and with the chin rest broken away.
Figure 5:
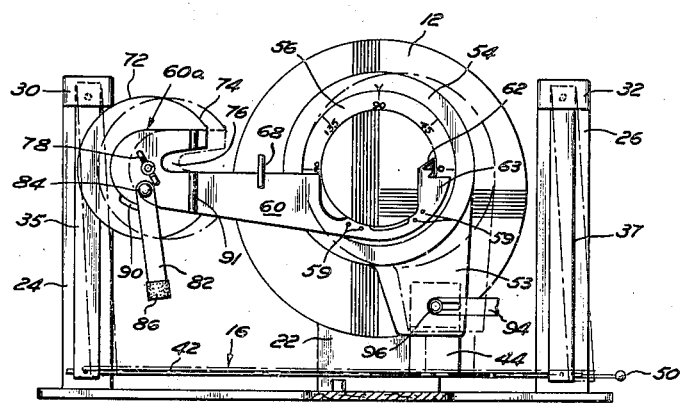
Figure 5 is a front elevation view of the swinging spectacle-holding structure in two positions of oscillation.
Figure 6:
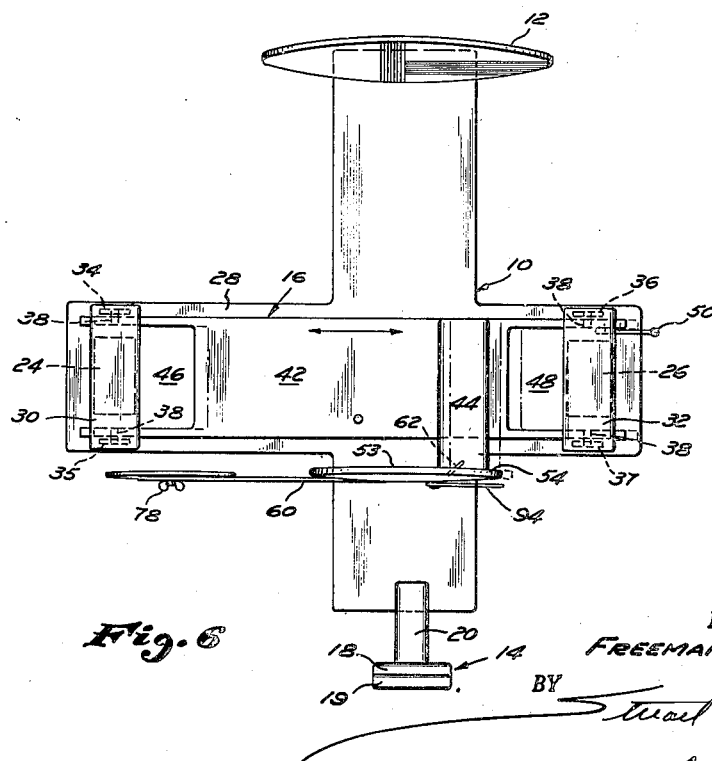
Figure 6 is a top plan view of my lens neutralizer also showing the carriage in two positions of oscillation.

The lens-mounting mechanism, which is carried by an upwardly inclined bracket plate 53 attached to the free end of the platform-anchored, forwardly inclined supporting arm 44, consists of a substantially vertically disposed, fixed annulus 54, having a coplanar, inner rotatable ring 56 held against axial displacement therein by reason of an outer peripheral rib 58 (see Figure 2) journalled in a corresponding groove of the annulus. The forward face of the ring 56 is graduated in angular degrees similar to a protractor and has rigidly secured along its lower edge by bolts or rivets 59 a radially projecting, elongated, flat arm 60, formed of sheet metal or the like. From the inner end of the arm 60 a short fin 62 is bent nearly perpendicular thereto so as to extend into and through the central aperture of the ring 56 (see Figure 4) while a small segment 63 of adjacent unbent surface is disposed to overlie the ring aperture and is provided with an obliquely cut notch 64 adapted to receive therein one temple 66 of a pair of spectacles 17 which are thus suspended in front of the ring 56, which temple is further held in outstretched position (within the ring) by abutment against the rear edge of the fin 62. A substantially vertical boss 68 is located on the arm 60 in position to engage the lens opposite that under test, and thereby enhance the rigidity with which the spectacles are mounted on the arm 60.

The outer, generally circular end 60a of the radial arm is provided with a flat rotatable latch 72 of somewhat greater diameter, disposed in lateral registration therewith and having a tapered engaging finger 74 serrated along its inner eccentrically directed edge. A cooperating slot 76 formed in the radial arm 60a adjacent the latch finger and opening toward the inner end of the arm is arranged so that the other temple 76 of the spectacles which are being mounted may be inserted therein and subsequently tightly engaged by the latch finger 74 swung down over the inner edge thereof, the latter being then firmly secured in locking position by a wing nut 78 threaded onto a bolt 80 which serves to hold together the rounded arm end 60a and adjacent latch 72.

An outwardly bowed, resilient, contact arm 82 is also swingingly mounted on the rounded arm end by a rivet 84, being provided with a non-abrasive shield 86, such as rubber, at its free end so that the same may be swung up and allowed to press against the outer face of the spectacle lens 88. The latch 72 is in turn formed with an open ended, curved slit 90 cut out so as to allow the latch to rotate about the bolt 80 without contacting the rivet 84; while the arm end 60a further contains a forwardly projecting boss 91 designed to abut against the lens not under test in a pair of spectacles so much larger than those illustrated that the boss 68 fails to make contact therewith.

The bracket plate 53 carried by the swinging arm 44 also supports on its front face a semi-circular, lens-engaging cradle 92, suitably grooved to hold one or more trial lenses of the type commonly used in optometry as one of a set known in the trade as "trial case lenses." The cradle 92 is mounted on the free end of a swinging arm 94 which is attached to the bracket 53 by means of a headed pin 96, and is formed of a spring steel or other suitable material processed of inherent resiliency. The parts are so proportioned and arranged that the arm 94 must be flexed slightly when it is swung upwards to position the trial case lens or lenses which it carries in alignment with the spectacle lens under test. The deformation of the arm 94 imposes sufficient friction between the arm 94 and its pivot 96 to retain the cradle 92 and its trial case lens or lenses in proper position with respect to the spectacle lens under test.

It will be seen that when the cradle 92 is in vertical position it is adapted to hold a trial lens or lenses in front of the spectacle lens under test and the two extremities of the slot 98 correspond to the alternate positions of the aligned spectacle lens depending upon whether the temple 66 lodged in the notch 64 is adjacent the upper or lower edge of the spectacles—that is, whether the spectacles are mounted in front of the ring 56 inverted or right side up, since one position is necessary for testing one spectacle lens and the other position for checking the opposite lens. Likewise, these two different lens positions correspond to the different viewing positions obtained by the observer from the two steps 18 and 19 of the chin rest.

In operation, a pair of spectacles are mounted across the front of radial arm 60 by resting one temple in the notch 64 and clamping the other temple in the opposite slot 76 by means of the serrated engaging finger 74, the arm 82 being swung up to press against the spectacle lens which is on the left (in relation to the operator). The protractor ring 56 together with its attached spectacles is then rotated until a position is located at which the two portions of one of the vertical target lines which crosses the central portion of the right spectacle lens (as viewed by the observer through the ring when his chin is resting on the appropriate ledge 18 or 19) appear continuous or unbroken.

The cradle arm 94 is now brought into operative position and successive test lenses are substituted in the cradle until one (or a combination of two lenses) is found through which the target does not appear to move as the spectacle carriage 16 is oscillated by its handle 50. This is a lens of power equal and opposite in character to that of the spectacle lens under test, so that as soon as its neutralizing effect on the spectacle lens is observed, the power of the latter in this particular meridian is immediately known. Since only the class of trial lenses known as "spheres" are used—that is, a lens of which the focal power is equal in all meridians—such lenses do not need to be aligned axially with the spectacle lens but may be inserted in the cradle in any position of rotation while remaining, of course, parallel to the face of the spectacle lens.

The protractor ring 56 and its attached spectacles are then rotated 90° so as to align the second principal meridian of the lens with a vertical line on the target 12 and the power of the lens in relation to this meridian is likewise determined by neutralization with trial "spheres" as just described. This information completes the identification of the prescription of the lens being tested, and is expressed in "crossed cylinders." Transposition of these values into the conventional form of expressing prescriptions optometrically as compounds is a simple operation familiar to those skilled in the art.

Accordingly, the spectacles are then dismounted, inverted, and clamped as before but with the other spectacle lens in front of the protractor ring 56. The location and power of the two principal meridians of this lens are then determined as just described for the first lens, except that the alternate chin groove (18 or 19) and the opposite cradle adjustment along the slot 98 are employed.

In place of a pair of spectacles, a single lens may be similarly tested and for this purpose there is provided the attachment of Figure 7 consisting of a flat plate 104 having a narrow fin 106 and 108 turned back along each end of its upper edge so that they may be inserted respectively in the notch 64 and slot 76 of the radial arm 60 just as the temples of a pair of spectacles would be mounted. The contact arm 82 may then be swung up to hold the left portion 110 of the plate securely against the corresponding section of the radial arm 60, and the latch 72 fastened over the adjacent fin 106. The upper portion of the right half of the mounting plate is cut away at 112 and the lower bridge section thereof 114 has secured to both its front and back faces a pair of upwardly projecting, outwardly bowed, resilient engaging arms 116, 117, 118, and 119, the corresponding arms of each pair having their adjacent faces normally disposed in registration with each other and being adapted, due to their resilient construction, to thus hold a single lens inserted therebetween. Preferably each arm is provided with a sleeve of non-scratching cushioning material such as leather by which to make contact with the lens being tested.

It is thus seen that by the present construction I have produced a quick and highly efficient lens-testing device which eliminates the present troublesome procedure of ink-spotting the axis and accurately aligning the axis of a trial case cylinder with the axis of the lens under test as done in hand neutralization, which device can be used with ordinary trial-case spheres such as every optometrist possesses, and which readily yields precise and accurate results. This may be especially appreciated in comparison with the clumsy, tedious and lengthy procedure of hand neutralization with trial-case lenses still utilized by many for examining old prescriptions or checking completed work.

While I have shown and described in some detail a presently preferred embodiment of my lens neutralizer, it is to be understood that various modifications may be made in the construction and operation thereof within the scope of the subsequently claimed invention which is to be construed broadly and limited only by the prior art.

I claim:

1. A lens testing device including in combination: a base; a substantially flat, upright viewing target disposed adjacent one end of said base, said target having two series of parallel lines disposed at right angles to each other; an upstanding chin rest disposed at the opposite end of said base; a transversely reciprocable carriage mounted on said base between said ends; an annular element rotatably mounted on said carriage, having indicia indicating angular degrees and having spectacle-engaging means adapted to retain either lens of a pair of spectacles adjacent the central aperture of said annular element while the same is rotated, said target, annular element, and chin rest all being disposed in linear alignment so as to provide a visual path through said lens to said target for an observer supporting his chin on the rest; and a cradle for detachably retaining an additional lens, said cradle being adjustably mounted on said carriage so that a lens held therein may be interposed in said visual path substantially parallel to said spectacle lens.

2. The device of claim 1 wherein said annular element bears a radially projecting arm rotatable therewith, said arm carrying on its outer end a swingable latch having an eccentrically directed, serrated engaging finger adapted to grasp one temple of a pair of spectacles when the other temple is held by said spectacle-engaging means of said annular element.

3. A lens-testing device of the character described, comprising a frame, a viewing target carried by said frame adjacent one end thereof, a support for the head of an observer rigid with said frame adjacent the other end thereof whereby the observer is enabled to retain his head substantially in fixed position with respect to said target and thereby maintain a substantially fixed line of vision to said target, a lens carrier mounted on said frame for oscillation in a flat plane extending transversely with respect to said frame intermediate the ends thereof, means for detachably securing a lens to be tested on said carrier within said line of vision and with its optical axis perpendicular to said frame, and a trial lens cradle carried by said lens carrier and adapted to releasably mount a trial lens adjacent said lens to be tested and with its optical axis substantially coinciding with that of said lens to be tested.

4. A lens-testing device of the character described, comprising a frame, a viewing target carried by said frame adjacent one end thereof, a support for the head of an observer rigid with said frame adjacent the other end thereof whereby the observer is enabled to retain his head substantially in fixed position with respect to said target and thereby maintain a substantially fixed line of vision to said target, a platform mounted on said frame for oscillation in a flat plane extending transversely of said frame between said target and said head support, an apertured bracket plate carried by said platform in a transverse plane substantially perpendicular to said line of vision, an annulus carried by said plate with its central opening in registry with the aperture thereof, said annulus being rotatable about its own axis and in a plane substantially perpendicular to said line of vision, means for detachably securing a lens to be tested with its optical axis extending through said opening of said annulus and through said aperture of said plate and substantially perpendicular to said plane of oscillation, and a trial lens cradle carried by said plate and adapted to releasably mount a trial lens adjacent said lens to be tested and with its optical axis substantially coinciding with said lens to be tested.

5. A lens-testing device of the character described, comprising a frame, a viewing target carried by said frame adjacent one end thereof, a support for the head of an observer rigid with said frame adjacent the other end thereof whereby the observer is enabled to retain his head substantially in fixed position with respect to said target and thereby maintain a substantially fixed line of vision to said target, a pair of crossheads mounted rigidly upon said frame, each of said crossheads extending longitudinally with respect to said frame, said crossheads being spaced apart transversely with respect to said frame, a rod depending from each end of each of said crossheads, the upper end of each of said rods being pivoted to the associated cross head for movement about a longitudinal axis, a platform carried by said rods, the lower end of each of said rods being pivoted to said platform for movement about a longitudinal axis whereby said platform is guided in transverse oscillation, an apertured bracket plate carried by said platform, an annulus carried by said plate with its central opening in registry with the aperture thereof, said annulus being rotatable about its own axis in a plane substantially perpendicular to said line of vision, means for detachably securing a lens to be tested to said annulus with its optical axis extending through said opening of said annulus and through said aperture of said plate and substantially perpendicular to said plane of oscillation, and a trial lens cradle carried by said plate and adapted to releasably mount a trial lens adjacent said lens to be tested and with its optical axis substantially coinciding with said lens to be tested.

FREEMAN C. BLACK.

REFERENCES CITED

The following references are of record in the file of this patent:

UNITED STATES PATENTS

| Number | Name | Date |
|---|---|---|
| 1,047,000 | De Zeng | Dec. 10, 1912 |
| 2,348,858 | Sheehy | May 16, 1944 |

FOREIGN PATENTS

| Number | Country | Date |
|---|---|---|
| 261,468 | Germany | Nov. 30, 1912 |